United States Patent
Alotaibi et al.

(10) Patent No.: US 12,479,736 B2
(45) Date of Patent: Nov. 25, 2025

(54) MESOPOROUS ZEOLITES AND METHODS OF MAKING THE SAME

(71) Applicant: Saudi Arabian Oil Company, Dhahran (SA)

(72) Inventors: Faisal Alotaibi, Al-Khobar (SA); Lianhui Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 521 days.

(21) Appl. No.: 18/168,889

(22) Filed: Feb. 14, 2023

(65) Prior Publication Data

US 2024/0270583 A1 Aug. 15, 2024

(51) Int. Cl.
*C01B 39/02* (2006.01)
*C01B 39/04* (2006.01)
*C01B 39/24* (2006.01)

(52) U.S. Cl.
CPC ............ *C01B 39/026* (2013.01); *C01B 39/04* (2013.01); *C01B 39/24* (2013.01); *C01P 2006/12* (2013.01); *C01P 2006/14* (2013.01); *C01P 2006/16* (2013.01)

(58) Field of Classification Search
CPC ....... C01B 39/026; C01B 39/24; C01B 39/04; C01P 2006/16; C01P 2006/12
See application file for complete search history.

(56) References Cited

U.S. PATENT DOCUMENTS

| | | | |
|---|---|---|---|
| 9,295,980 B2 | 3/2016 | Garcia-Martinez et al. | |
| 9,376,324 B2* | 6/2016 | Senderov | B01J 29/084 |
| 10,407,311 B2 | 9/2019 | Ding et al. | |
| 2011/0171121 A1 | 7/2011 | Senderov et al. | |

FOREIGN PATENT DOCUMENTS

| | | |
|---|---|---|
| CN | 107344720 A | 11/2017 |
| EP | 3718629 A1 | 10/2020 |
| WO | 2010083488 A2 | 7/2010 |
| WO | 2018212986 A1 | 11/2018 |

OTHER PUBLICATIONS

Gola et al., "Effect of leaching agent in the dealumination of stabilized Y zeolites", Microporous and Mesoporous Materials, vol. 40, pp. 73-83, 2000.
Kerstens et al., "State of the Art and Perspectives of Hierarchical Zeolites: Practical Overview of Synthesis Methods and Use in Catalysis", Advanced Materials, vol. 32, 2004690, 47 Pages, 2020.

(Continued)

*Primary Examiner* — Anthony J Zimmer
*Assistant Examiner* — Annette Phan
(74) *Attorney, Agent, or Firm* — DINSMORE & SHOHL LLP

(57) ABSTRACT

A method of making a mesoporous zeolite may include combining an initial zeolite with cetyltrimethylammonium bromide to form an initial zeolite mixture. The method may also include adding ammonium hexafluorosilicate and ammonium hydroxide to the initial zeolite mixture to form a treated zeolite mixture. The method may also include heating the treated zeolite mixture to form the mesoporous zeolite.

20 Claims, 2 Drawing Sheets

(56) References Cited

OTHER PUBLICATIONS

Li et al., "Realizing the Commercial Potential of Hierarchical Zeolites: New Opportunities in Catalytic Cracking", ChemCatChem, vol. 6, No. 1, pp. 46-66, 2014.
Li et al., "Defects in AHFS-dealuminated Y zeolite: A crucial factor for mesopores formation in the following base treatment procedure", Microporous and Mesoporous Materials, vol. 255, pp. 242-252, 2018.
Martinez et al., "Stabilized hierarchical USY zeolite catalysts for simultaneous increase in diesel and LPG olefinicity during catalytic cracking", Catalysis Science & Technology, vol. 3, pp. 972-981, 2013.
Qin et al., "Mesoporous Y zeolite with homogeneous aluminum distribution obtained by sequential desilication-dealumination and its performance in the catalytic cracking of cumene and 1,3,5-triisopropylbenzene", Journal of Catalysis, vol. 278, pp. 266-275, 2011.
Qin et al., "A defect-based strategy for the preparation of mesoporous zeolite Y for high-performance catalytic cracking", Journal of Catalysis, vol. 298, pp. 102-111, 2013.
Notification of Transmittal of the International Search Report and the Written Opinion of the International Searching Authority, or the Declaration dated Jun. 3, 2024 pertaining to International application No. PCT/US2024/012175 filed Jan. 19, 2024, pp. 1-17.

\* cited by examiner

MESOPOROUS ZEOLITES AND METHODS OF MAKING THE SAME

TECHNICAL FIELD

Embodiments of the present disclosure generally relate to zeolites and, more particularly, to methods of making zeolites.

BACKGROUND

Materials that include pores, such as zeolites, may be utilized in many petrochemical industrial applications. For example, such materials may be utilized as catalysts in a number of reactions which convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5, Beta, or Y. Zeolites having mesoporous structures are particularly desired as the pore size of mesoporous zeolites may allow for specific hydrocarbons to be selectively reacted, improving the catalytic performance of the zeolite compared to non-mesoporous zeolites in specific reactions.

SUMMARY

Accordingly, there is a need for improved methods of making mesoporous zeolites. The methods disclosed herein may be utilized to make a mesoporous zeolite in a simplified process compared to conventional methods of making a mesoporous zeolite. For example, conventional methods of making mesoporous zeolites may utilize multiple chemical treatment steps along with processing steps such as filtering, drying, or calcining between treatment steps, while the methods of the present disclosure may perform multiple chemical treatments simultaneously, which may reduce the number of processing steps needed to form a mesoporous zeolite, when compared to conventional methods of making mesoporous zeolites. In particular, the methods of the present disclosure add ammonium hexafluorosilicate and ammonium hydroxide to an initial zeolite mixture comprising a zeolite and cetyltrimethylammonium bromide, while conventional methods may combine ammonium hexafluorosilicate, ammonium hydroxide, and cetyltrimethylammonium bromide with the zeolite separately without forming a mixture that contains all three compounds and the zeolite requiring additional processing steps to separate out the zeolite following the addition of each compound.

According to one or more embodiments of the present disclosure a method of making a mesoporous zeolite may comprise combining an initial zeolite with cetyltrimethylammonium bromide to form an initial zeolite mixture, adding ammonium hexafluorosilicate and ammonium hydroxide to the initial zeolite mixture to form a treated zeolite mixture, and heating the treated zeolite mixture to form the mesoporous zeolite.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

The following detailed description of specific embodiments of the present disclosure can best be understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Generally described in this disclosure are methods of making mesoporous zeolites. The present disclosure also relates to mesoporous zeolites that may be produced from the methods described herein.

Figure 1:
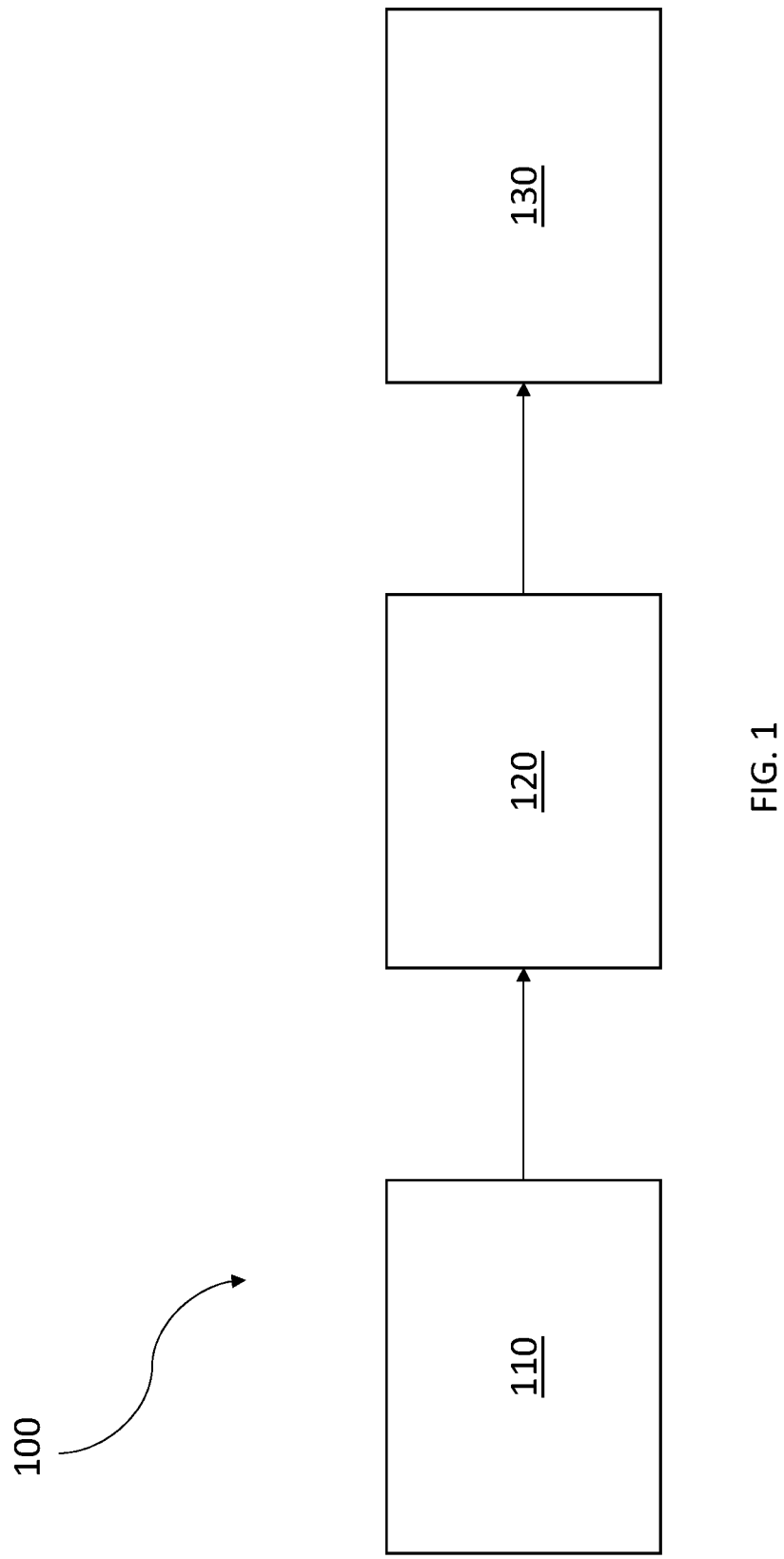
FIG. 1 depicts a process flow diagram that includes steps for making a mesoporous zeolite, according to one or more embodiments of the present disclosure.

Now referring to FIG. 1, a process flow diagram 100 for a method of making a mesoporous zeolite according to one or more embodiments described herein is depicted. Generally the method may comprise at least step 110 of combining an initial zeolite with cetyltrimethylammonium bromide (CTAB) to form an initial zeolite mixture, step 120 of adding ammonium hexafluorosilicate (AFHS) and ammonium hydroxide to the initial zeolite mixture to form a treated zeolite mixture, and step 130 of heating the treated zeolite mixture to form a mesoporous zeolite.

As used throughout this disclosure, "zeolites" generally refers to micropore-containing inorganic materials with regular intra-crystalline cavities and channels of molecular dimension, as is understood by those in the art. In one or more embodiments, the zeolites described herein may be referred to as "mesoporous zeolites." As such, "zeolites" and "mesoporous zeolites" may be used interchangeably throughout this disclosure for embodiments which include mesopores, as is described in detail herein. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. Micropores may refer to pores in a structure that have a diameter of less than or equal to 2 nm and greater than or equal to 0.1 nm, and mesopores may refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size.

Without being bound by theory it is believed that CTAB may enter inside the zeolite and reside in the channels and cages. During AFHS treatment, some aluminum in the framework of the zeolite is removed, and at the same time, CTAB takes the void left by dealumination, and protect the zeolite structure from being damaged. During the calcination step, the CTAB is burned and removed, and thus mesopores are formed, thus increasing the size of one or more pores of the zeolite, where the increase in size may increase the amount of mesopores (pores having a diameter of greater than 2 nm and less than or equal to 50 nm) throughout the zeolite without significantly changing the inherent structure of the parent zeolite.

In one or more embodiments, the initial zeolite may comprise an FAU framework type zeolite, such as zeolite Y or ultra-stable zeolite Y (USY). As used herein, "zeolite Y" and "USY" refer to a zeolite having a FAU framework type according to the IZA zeolite nomenclature and consisting majorly of silica and alumina, as would be understood by one skilled in the art. Examples of suitable initial zeolites include those zeolites commercially available from Zeolyst International such as, CBV-300, CBV-400, or CBV-500, and from TOSOH Corporation, such as HSZ-300.

As described herein, the method of making a mesoporous zeolite may include step 110 of combining an initial zeolite with CTAB to form an initial zeolite mixture. The initial zeolite mixture may be an aqueous solution. In some embodiments, the CTAB may be in an aqueous solution before being combined with the initial zeolite. In other embodiments, solid CTAB may be combined with water and the initial zeolite to form the initial zeolite mixture.

In one or more embodiments, the concentration of CTAB in the initial zeolite mixture may be from 0.01 M to 1.0 M. For example, the concentration of CTAB in the initial zeolite mixture may be from 0.01 M to 0.9 M, such as from 0.01 M to 0.8 M, from 0.01 M to 0.7 M, from 0.01 M to 0.6 M, from 0.01 M to 0.5 M, from 0.01 M to 0.4 M, from 0.01 M to 0.3 M, from 0.01 M to 0.2 M, from 0.01 M to 0.1 M, from 0.1 M to 1.0 M, from 0.1 M to 0.9 M, from 0.1 M to 0.8 M, from 0.1 M to 0.7 M, from 0.1 M to 0.6 M, from 0.1 M to 0.5 M, from 0.1 M to 0.4 M, from 0.1 M to 0.3 M, from 0.1 M to 0.2 M, from 0.2 M to 1.0 M, from 0.2 M to 0.9 M, from 0.2 M to 0.8 M, from 0.2 M to 0.7 M, from 0.2 M to 0.6 M, from 0.2 M to 0.5 M, from 0.2 M to 0.4 M, from 0.2 M to 0.3 M, from 0.3 M to 1.0 M, from 0.3 M to 0.9 M, from 0.3 M to 0.8 M, from 0.3 M to 0.7 M, from 0.3 M to 0.6 M, from 0.3 M to 0.5 M, from 0.3 M to 0.4 M, from 0.4 M to 1.0 M, from 0.4 M to 0.9 M, from 0.4 M to 0.8 M, from 0.4 M to 0.7 M, from 0.4 M to 0.6 M, from 0.4 M to 0.5 M, from 0.5 M to 1.0 M, from 0.5 M to 0.9 M, from 0.5 M to 0.8 M, from 0.5 M to 0.7 M, from 0.5 M to 0.6 M, from 0.6 M to 1.0 M, from 0.6 M to 0.9 M, from 0.6 M to 0.8 M, from 0.6 M to 0.7 M, from 0.7 M to 1.0 M, from 0.7 M to 0.9 M, from 0.7 M to 0.8 M, from 0.8 M to 1.0 M, from 0.8 M to 0.9 M, from 0.9 M to 1.0 M, or any combination of these ranges. Without being bound by theory, it is believed that a concentration of CTAB in the initial zeolite mixture below 0.1 M may not be sufficient to protect the zeolite structure during dealumination. However, it is also believed, that a concentration of CTAB in the initial zeolite mixture of above 1.0 M may form excess CTAB outside the zeolite structure which may increase the cost of manufacturing.

In one or more embodiments, after combining the initial zeolite with CTAB the initial zeolite mixture may be heated. In one or more embodiments, the initial zeolite mixture may be heated to a temperature of from 30° C. to 100° C. For example, the initial zeolite mixture may be heated to a temperature that is from 30° C. to 90° C., from 30° C. to 80° C., from 30° C. to 70° C., from 30° ° C. to 60° C., from 30° C. to 50° C., from 30° C. to 40° C., from 40° C. to 100° C., from 40° C. to 90° C., from 40° ° C. to 80° C., from 40° ° C. to 70° C., from 40° C. to 60° C., from 40° ° C. to 50° C., from 50° ° C. to 100° C., from 50° ° C. to 90° C., from 50° C. to 80° C., from 50° C. to 70° C., from 50° C. to 60° C., from 60° C. to 100° C., from 60° C. to 90° C., from 60° ° C. to 80° C., from 60° C. to 70° C., from 70° ° C. to 100° C., from 70° ° C. to 90° C., from 70° C. to 80° ° C., from 80° C. to 100° C., from 80° C. to 90° C., from 90° C. to 100° C., or any combination of these ranges. Without being bound by theory, it is believed that heating the initial zeolite mixture to a temperature below 30° C. may reduce the rate of dealumination and silicon insertion in the zeolite. However, it is also believed that if the initial zeolite mixture is heated to a temperature of greater than 100° C. the rate of dealumination may increase to a point where the zeolite structure may collapse.

Still referring to the process flow diagram 100 of FIG. 1, step 120 generally includes adding AFHS and ammonium hydroxide to the initial zeolite mixture to form a treated zeolite mixture. In one or more embodiments, the AFHS and the ammonium hydroxide may be combined prior to adding them to the initial zeolite mixture. In other embodiments, the AFHS may be added to the initial zeolite mixture prior to adding the ammonium hydroxide to the initial zeolite mixture. In still more embodiments, the ammonium hydroxide may be added to the initial zeolite mixture prior to adding the AFHS to the initial zeolite mixture. The AHFS and the ammonium hydroxide may be in an aqueous solution. In one or more embodiments, nothing is added to the initial zeolite mixture after being formed prior to adding the AFHS and the ammonium hydroxide. In one or more embodiments the AFHS and the ammonium hydroxide may be added to the initial zeolite mixture in the same vessel the initial zeolite mixture was formed in.

In one or more embodiments, the AFHS and the ammonium hydroxide may be added to the initial zeolite mixture all at once. In other embodiments, the AFHS and the ammonium hydroxide may be gradually added to the initial zeolite mixture. As used herein the term "gradually" means adding relatively slowly and/or periodically over a given period of time. In some embodiments, the AFHS and the ammonium hydroxide may be added to the initial zeolite mixture over a time period of greater than or equal to 1 minute, such as greater than or equal to 30 minutes, greater than or equal to 60 minutes, greater than or equal to 90 minutes, greater than or equal to 120 minutes, greater than or equal to 150 minutes, greater than or equal to 180 minutes, greater than or equal to 210 minutes, greater than or equal to 240 minutes, greater than or equal to 270 minutes, greater than or equal to 300 minutes, greater than or equal to 330 minutes, or even greater than or equal to 360 minutes. In further embodiments, the AFHS and the ammonium hydroxide may be added to the initial zeolite mixture gradually over a period of time of from 1 minute to 180 minutes, such as from 1 minute to 150 minutes, from 1 minute to 120 minutes, from 1 minute to 90 minutes, from 1 minute to 60 minutes, from 1 minute to 30 minutes, from 30 minutes to 180 minutes, from 30 minutes to 150 minutes, from 30 minutes to 120 minutes, from 30 minutes to 90 minutes, from 30 minutes to 60 minutes, from 60 minutes to 180 minutes, from 60 minutes to 150 minutes, from 60 minutes to 120 minutes, from 60 minutes to 90 minutes, from 90 minutes to 180 minutes, from 90 minutes to 150 minutes, from 90 minutes to 120 minutes, from 120 minutes to 180 minutes, from 120 minutes to 150 minutes, from 150 minutest to 180 minutes, or any combination of these ranges. Without being bound by theory, it is believed that by gradually adding the AFHS and the ammonium hydroxide the rate of dealumination and silicon insertion into the zeolite may be balanced. It is believed that rapidly adding the AFHS to the initial zeolite mixture may increase the rate of dealumination to greater than the rate of silicon insertion which may damage the stability of the zeolite's structure.

In one or more embodiments, the concentration of the AHFS solution added to the initial zeolite mixture may be from 0.1 M to 2.0 M. For example, the concentration of the AHFS solution may be from 0.1 M to 1.8 M, such as from 0.1 M to 1.6 M, from 0.1 M to 1.4 M, from 0.1 M to 1.2 M, from 0.1 M to 1.0 M, from 0.1 M to 0.8 M, from 0.1 M to 0.6 M, from 0.1 M to 0.4 M, from 0.1 M to 0.2 M, from 0.2 M to 2.0 M, from 0.2 M to 1.8 M, from 0.2 M to 1.6 M, from 0.2 M to 1.4 M, from 0.2 M to 1.2 M, from 0.2 M to 1.0 M, from 0.2 M to 0.8 M, from 0.2 M to 0.6 M, from 0.2 M to 0.4 M, from 0.4 M to 2.0 M, from 0.4 M to 1.8 M, from 0.4 M to 1.6 M, from 0.4 M to 1.4 M, from 0.4 M to 1.2 M, from 0.4 M to 1.0 M, from 0.4 M to 0.8 M, from 0.4 M to 0.6 M, from 0.6 M to 2.0 M, from 0.6 M to 1.8 M, from 0.6 M to 1.6 M, from 0.6 M to 1.4 M, from 0.6 M to 1.2 M, from 0.6 M to 1.0 M, from 0.6 M to 0.8 M, from 0.8 M to 2.0 M, from 0.8 M to 1.8 M, from 0.8 M to 1.6 M, from 0.8 M to 1.4 M, from 0.8 M to 1.2 M, from 0.8 M to 1.0 M, from 1.0 M to 2.0 M, from 1.0 M to 1.8 M, from 1.0 M to 1.6 M, from 1.0 M to 1.4 M, from 1.0 M to 1.2 M, from 1.2 M to 2.0 M, from 1.2 M to 1.8 M, from 1.2 M to 1.6 M, from 1.2 M to 1.4 M, from 1.4 M to 2.0 M, from 1.4 M to 1.8 M, from 1.4 M to 1.6 M, from 1.6 M to 2.0 M, from 1.6 M to 1.8 M, from 1.8 M to 2.0 M, or any combination of these ranges. Without being bound by theory, it is believed that AFHS may modify the framework of zeolite forming a framework-modified zeolite. It is also believed that AFHS may affect the structure of a zeolite in several ways. For example, it is believed that the $NH_4^+$ and $SiF_6^-$ ions of an AFHS solution may simultaneously remove Al and Na cations from the framework of a zeolite. Additionally, it is believed that the Si in $SiF_6^-$ may be inserted back into the vacancy in the framework left by Al removal. Accordingly, AFHS treatment may increase the Si/Al ratio of a zeolite.

In one or more embodiments, the concentration of the ammonium hydroxide solution added to the initial zeolite mixture may be from 0.01 M to 1.0 M. For example, the concentration of the ammonium hydroxide solution may be from 0.01 M to 0.9 M, such as from 0.01 M to 0.8 M, from 0.01 M to 0.7 M, from 0.01 M to 0.6 M, from 0.01 M to 0.5 M, from 0.01 M to 0.4 M, from 0.01 M to 0.3 M, from 0.01 M to 0.2 M, from 0.01 M to 0.1 M, from 0.1 M to 1.0 M, from 0.1 M to 0.9 M, from 0.1 M to 0.8 M, from 0.1 M to 0.7 M, from 0.1 M to 0.6 M, from 0.1 M to 0.5 M, from 0.1 M to 0.4 M, from 0.1 M to 0.3 M, from 0.1 M to 0.2 M, from 0.2 M to 1.0 M, from 0.2 M to 0.9 M, from 0.2 M to 0.8 M, from 0.2 M to 0.7 M, from 0.2 M to 0.6 M, from 0.2 M to 0.5 M, from 0.2 M to 0.4 M, from 0.2 M to 0.3 M, from 0.3 M to 1.0 M, from 0.3 M to 0.9 M, from 0.3 M to 0.8 M, from 0.3 M to 0.7 M, from 0.3 M to 0.6 M, from 0.3 M to 0.5 M, from 0.3 M to 0.4 M, from 0.4 M to 1.0 M, from 0.4 M to 0.9 M, from 0.4 M to 0.8 M, from 0.4 M to 0.7 M, from 0.4 M to 0.6 M, from 0.4 M to 0.5 M, from 0.5 M to 1.0 M, from 0.5 M to 0.9 M, from 0.5 M to 0.8 M, from 0.5 M to 0.7 M, from 0.5 M to 0.6 M, from 0.6 M to 1.0 M, from 0.6 M to 0.9 M, from 0.6 M to 0.8 M, from 0.6 M to 0.7 M, from 0.7 M to 1.0 M, from 0.7 M to 0.9 M, from 0.7 M to 0.8 M, from 0.8 M to 1.0 M, from 0.8 M to 0.9 M, from 0.9 M to 1.0 M, or any combination of these ranges. Without being bound by theory it is believed that ammonium hydroxide may facilitate the removal of silicon from a zeolite framework to generate mesopores. It is also believed that ammonium hydroxide may function as an ion-exchange agent to reduce the amount of $Na^+$ in the mesoporous zeolite.

The amount of AFHS and ammonium hydroxide added to the initial zeolite mixture may be varied depending on the quantity of the initial zeolite present in the initial zeolite mixture. In one or more embodiments, a ratio of the weight of the AFHS solution and the ammonium hydroxide solution to the weight of the initial zeolite is from 0.1 to 1.0. For example, the ratio of the weight of the AFHS solution and the ammonium hydroxide solution to weight of the initial zeolite is from 0.1 to 0.9, from 0.1 to 0.8, from 0.1 to 0.7, from 0.1 to 0.6, from 0.1 to 0.5, from 0.1 to 0.4, from 0.1 to 0.3, from 0.1 to 0.2, from 0.2 to 1.0, from 0.2 to 0.9, from 0.2 to 0.8, from 0.2 to 0.7, from 0.2 to 0.6, from 0.2 to 0.5, from 0.2 to 0.4, from 0.2 to 0.3, from 0.3 to 1.0, from 0.3 to 0.9, from 0.3 to 0.8, from 0.3 to 0.7, from 0.3 to 0.6, from 0.3 to 0.5, from 0.3 to 0.4, from 0.4 to 1.0, from 0.4 to 0.9, from 0.4 to 0.8, from 0.4 to 0.7, from 0.4 to 0.6, from 0.4 to 0.5, from 0.5 to 1.0, from 0.5 to 0.9, from 0.5 to 0.8, from 0.5 to 0.7, from 0.5 to 0.6, from 0.6 to 1.0, from 0.6 to 0.9, from 0.6 to 0.8, from 0.6 to 0.7, from 0.7 to 1.0, from 0.7 to 0.9, from 0.7 to 0.8, from 0.8 to 1.0, from 0.8 to 0.9, from 0.9 to 1.0, or any combination of these ranges. Without being bound by theory it is believed that if the weight ratio of AFHS and ammonium hydroxide to initial zeolite is less than 0.1 less aluminum may be removed from the zeolite and the Si to Al molar ratio of the zeolite may be lower than desired. It is believed that if the weight ratio is higher than 1.0 enough aluminum may be removed that the stability of the zeolite structure may be lowered.

In one or more embodiments, the initial zeolite mixture may not be processed before being treated with AFHS and ammonium hydroxide. As used herein the term "processed" may refer to additional treatment steps performed on the initial zeolite mixture. For example, the initial zeolite mixture may not be exposed to steam or undergo hydrothermal treatment prior to forming the treated zeolite mixture in step 120. The initial zeolite mixture may also not be dried, filtered or calcined prior to forming the treated zeolite mixture. Without being bound by theory, it is believed that by utilizing the presently disclosed methods one can form a mesoporous zeolite without requiring additional processing steps between forming the initial zeolite mixture and adding AFHS and ammonium hydroxide to form the treated zeolite mixture. The additional processing steps may increase the costs associated with the conventional methods for making a mesoporous zeolite as compared to the methods of the present disclosure.

Still referring to FIG. 1, step 130 generally includes heating the treated zeolite mixture to form a mesoporous zeolite. In one or more embodiments, the treated zeolite mixture may be heated to a temperature that is from 30° C. to 100° C. For example, the treated zeolite mixture may be heated to a temperature that is from 30° C. to 90° C., from 30° C. to 80° C., from 30° C. to 70° C., from 30° ° C. to 60° C., from 30° C. to 50° C., from 30° C. to 40° C., from 40°

C. to 100° C., from 40° C. to 90° C., from 40° C. to 80° C., from 40° C. to 70° C., from 40° C. to 60° C., from 40° C. to 50° C., from 50° ° C. to 100° C., from 50° C. to 90° C., from 50° C. to 80° C., from 50° C. to 70° C., from 50° C. to 60° ° C., from 60° C. to 100° ° C., from 60° C. to 90° C., from 60° C. to 80° C., from 60° C. to 70° C., from 70° ° C. to 100° C., from 70° C. to 90° C., from 70° C. to 80° C., from 80° C. to 100° C., from 80° ° C. to 90° C., from 90° C. to 100° C., or any combination of these ranges.

In one or more embodiments, the treated zeolite mixture may be heated for from 1 hour to 24 hours. For example, the treated zeolite mixture may be heated for from 1 hour to 21 hours, from 1 hour to 18 hours, from 1 hour to 15 hours, from 1 hour to 12 hours, from 1 hour to 9 hours, from 1 hour to 6 hours, from 1 hour to 3 hours, from 3 hours to 24 hours, from 3 hours to 21 hours, from 3 hours to 18 hours, from 3 hours to 15 hours, from 3 hours to 12 hours, from 3 hours to 9 hours, from 3 hours to 6 hours, from 6 hours to 24 hours, from 6 hours to 21 hours, from 6 hours to 18 hours, from 6 hours to 15 hours, from 6 hours to 12 hours, from 6 hours to 9 hours, from 9 hours to 24 hours, from 9 hours to 21 hours, from 9 hours to 18 hours, from 9 hours to 15 hours, from 9 hours to 12 hours, from 12 hours to 24 hours, from 12 hours to 21 hours, from 12 hours to 18 hours, from 12 hours to 15 hours, from 15 hours to 24 hours, from 15 hours to 21 hours, from 15 hours to 18 hours, from 18 hours to 24 hours, from 18 hours to 21 hours, from 21 hours to 24 hours, or any combination of these ranges.

In one or more embodiments, after heating the treated zeolite mixture to form the mesoporous zeolite, the mesoporous zeolite may be separated from the other components of the treated zeolite mixture. According to one or more embodiments, the separation may comprise a solids/liquids separation technique (e.g. centrifugation, filtering, etc.), followed by washing with water, drying, and then calcination at a temperature greater than 500° C. The use of other suitable separation techniques is contemplated herein.

Figure 2:
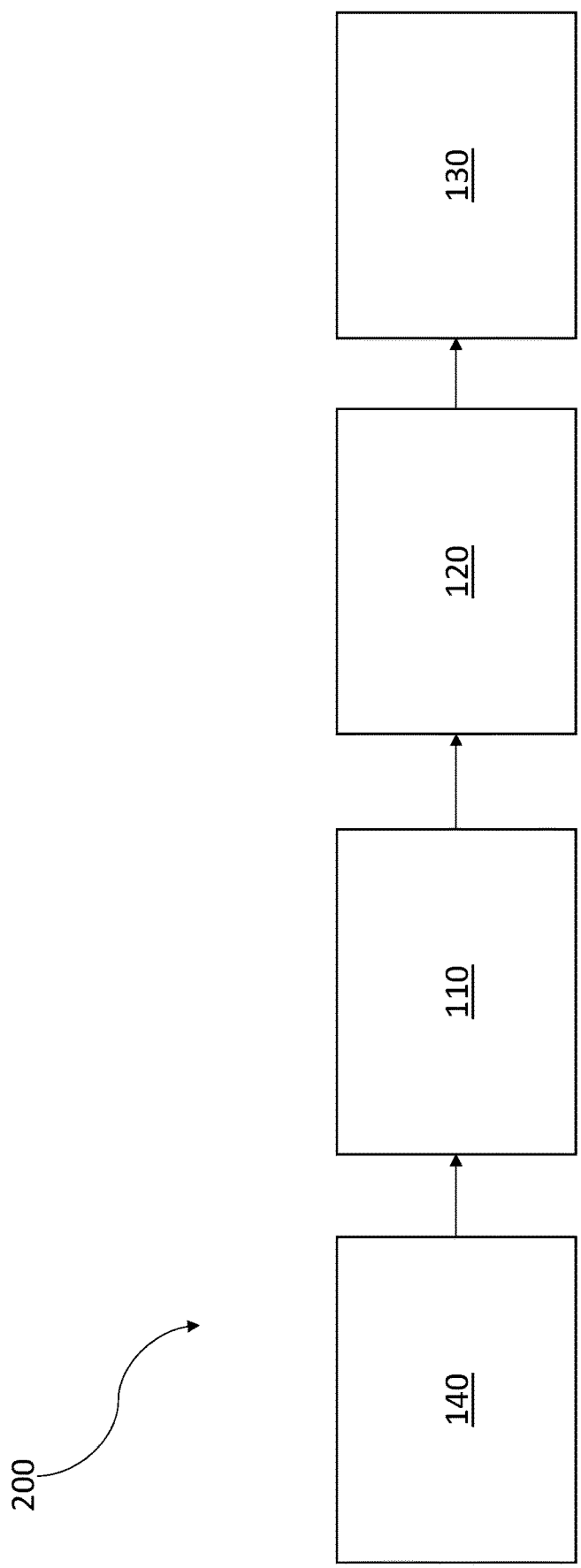
FIG. 2 depicts a process flow diagram that includes steps for making a mesoporous zeolite, according to one or more additional embodiments of the present disclosure.

Now referring to FIG. 2, a process flow diagram 200 got a method of making a mesoporous zeolite including an ion-exchange step 140 is depicted. According to one or more embodiments, the initial zeolite may first be ion-exchanged in step 140 before being mixed with CTAB to form the initial zeolite mixture in step 110. A zeolite, such as for example an NaY zeolite, may be ion exchanged to reduce the amount of $Na_2O$ present in the zeolite. In one or more embodiments the initial zeolite may be $NH_4^+$ ion-exchanged with an ion-exchange agent such as $NH_4NO_3$.

The mesoporous zeolites formed from the methods described herein may comprise mesopores. In one or more embodiments, the mesoporous zeolites formed by the methods described herein may have an average pore size of from 2 nm to 50 nm, such as from 2 nm to 45 nm, from 2 nm to 40 nm, from 2 nm to 35 nm, from 2 nm to 30 nm, from 2 nm to 25 nm, from 2 nm to 20 nm, from 2 nm to 15 nm, from 2 nm to 10 nm, from 2 nm to 5 nm, from 5 nm to 50 nm, from 5 nm to 45 nm, from 5 nm to 40 nm, from 5 nm to 35 nm, from 5 nm to 30 nm, from 5 nm to 25 nm, from 5 nm to 20 nm, from 5 nm to 15 nm, from 5 nm to 10 nm, from 10 nm to 50 nm, from 10 nm to 45 nm, from 10 nm to 40 nm, from 10 nm to 35 nm, from 10 nm to 30 nm, from 10 nm to 25 nm, from 10 nm to 20 nm, from 10 nm to 15 nm, from 15 nm to 50 nm, from 15 nm to 45 nm, from 15 nm to 40 nm, from 15 nm to 35 nm, from 15 nm to 30 nm, from 15 nm to 25 nm, from 15 nm to 20 nm, from 20 nm to 50 nm, from 20 nm to 45 nm, from 20 nm to 40 nm, from 20 nm to 35 nm, from 20 nm to 30 nm, from 20 nm to 25 nm, from 25 nm to 50 nm, from 25 nm to 45 nm, from 25 nm to 40 nm, from 25 nm to 35 nm, from 25 nm to 30 nm, from 30 nm to 50 nm, from 30 nm to 45 nm, from 30 nm to 40 nm, from 30 nm to 35 nm, from 35 nm to 50 nm, from 35 nm to 45 nm, from 35 nm to 40 nm, from 40 nm to 50 nm, from 40 nm to 45 nm, from 45 nm to 50 nm, or any combination of these ranges. Generally, average pore size can be determined by BET analysis, as is known in the art.

In one or more embodiments, the mesoporous zeolite may have a pore volume of at least 0.5 mL/g. As used herein, the term "pore volume" refers to the total pore volume of the zeolite. For example, the mesoporous zeolite may have a pore volume of at least 0.6 mL/g, at least 0.7 mL/g, at least 0.8 mL/g, at least 0.9 mL/g, or even at least 1.0 mL/g. In one or more embodiments, the mesoporous zeolite may have a pore volume of from 0.5 mL/g to 0.8 mL/g, such as from 0.5 mL/g to 0.75 mL/g, from 0.5 mL/g to 0.7 mL/g, from 0.5 mL/g to 0.65 mL/g, from 0.5 mL/g to 0.6 mL/g, from 0.5 mL/g to 0.55 mL/g, from 0.55 mL/g to 0.8 mL/g, from 0.55 mL/g to 0.75 mL/g, from 0.55 mL/g to 0.7 mL/g, from 0.55 mL/g to 0.65 mL/g, from 0.55 mL/g to 0.6 mL/g, from 0.6 mL/g to 0.8 mL/g, from 0.6 mL/g to 0.75 mL/g, from 0.6 mL/g to 0.7 mL/g, from 0.6 mL/g to 0.65 mL/g, from 0.65 mL/g to 0.8 mL/g, from 0.65 mL/g to 0.75 mL/g, from 0.65 mL/g to 0.7 mL/g, from 0.7 mL/g to 0.8 mL/g, from 0.7 mL/g to 0.75 mL/g, from 0.75 mL/g to 0.8 mL/g, or any combination of these ranges. Generally, pore volume size can be determined by BET analysis, as is known in the art.

In one or more embodiments, the mesoporous zeolite may have a molar ratio of $SiO_2$ to $Al_2O_3$ of from 8:1 to 15:1, such as from 8:1 to 14:1, from 8:1 to 13:1, from 8:1 to 12:1, from 8:1 to 11:1, from 8:1 to 10:1, from 8:1 to 9:1, from 9:1 to 15:1, from 9:1 to 14:1, from 9:1 to 13:1, from 9:1 to 12:1, from 9:1 to 11:1, from 8:1 to 10:1, from 10:1 to 15:1, from 10:1 to 14:1, from 10:1 to 13:1, from 10:1 to 12:1, from 10:1 to 11:1, from 11:1 to 15:1, from 11:1 to 14:1, from 11:1 to 13:1, from 11:1 to 12:1, from 12:1 to 15:1, from 12:1 to 14:1, from 12:1 to 13:1, from 13:1 to 15:1, from 13:1 to 14:1, from 14:1 to 15:1, or any combination of these ranges.

In one or more embodiments, the mesoporous zeolite may have a total surface area of at least 650 $m^2/g$. For example, the mesoporous zeolite may have a total surface area of at least 700 $m^2/g$, at least 750 $m^2/g$, at least 800 $m^2/g$, at least 8500 $m^2/g$, or even at least 900 $m^2/g$. In some embodiments, the mesoporous zeolite may have a total surface area of from 650 $m^2/g$ to 900 $m^2/g$, such as from 650 $m^2/g$ to 850 $m^2/g$, from 650 $m^2/g$ to 800 $m^2/g$, from 650 $m^2/g$ to 750 $m^2/g$, from 650 $m^2/g$ to 700 $m^2/g$, from 700 $m^2/g$ to 900 $m^2/g$, from 700 $m^2/g$ to 850 $m^2/g$, from 700 $m^2/g$ to 800 $m^2/g$, from 700 $m^2/g$ to 750 $m^2/g$, from 750 $m^2/g$ to 900 $m^2/g$, from 750 $m^2/g$ to 850 $m^2/g$, from 750 $m^2/g$ to 800 $m^2/g$, from 800 $m^2/g$ to 900 $m^2/g$, from 800 $m^2/g$ to 850 $m^2/g$, from 850 $m^2/g$ to 900 $m^2/g$, or from any combination of these ranges. Generally, surface area can be determined by BET analysis, as is known in the art.

In one or more embodiments the mesoporous zeolite may have a crystallinity of at least 80%, at least 85%, at least 90%, at least 95%, or at least 99%, of the crystallinity of the initial zeolite. Without being bound by theory it is believed that higher crystallinity may impart increased stability to the zeolite, and it is believed that zeolites with less than 80% crystallinity may not have the desired stability for use as catalysts in chemical reactions. Generally, crystallinity can be determined XRD analysis, as is known in the art.

EXAMPLES

The various embodiments of methods for making mesoporous zeolites will be further clarified by the following examples. The examples are illustrative in nature, and should not be understood to limit the subject matter of the present disclosure.

Example 1—Treatment of Zeolite Y

Four different zeolite treatment methods were utilized in preparing the zeolites. The zeolite treated in all four methods was a commercially available zeolite Y (CBV-300 available from Zeolyst International).

Comparative Example A was prepared by first combining 67 g of zeolite and 300 ml of deionized water and heating the mixture to 90° C. Separately, 16.5 g of ammonium hexafluorosilicate was added to 200 ml of deionized water and mixed until completely dissolved. The ammonium hexafluorosilicate solution was added drop wisely to the zeolite and water mixture over a period of 2 hours. The temperature of the mixture was then raised to from 90° C. to 95° C. and maintained for 2 hours. Stirring was stopped to allow the mixture to settle before filtering and washing the formed product. The wet cake was dried at 110° C. overnight before being calcined at 550° ° C. for 4 hours.

Comparative Example B was prepared by first combining 67 g of zeolite and 300 ml of deionized water and heating the mixture to 90° C. Separately, 16.5 g of ammonium hexafluorosilicate was added to 200 ml of deionized water and mixed until completely dissolved. The ammonium hexafluorosilicate solution was added drop wisely to the zeolite and water mixture over a period of 2 hours. The temperature of the mixture was then raised to from 90° C. to 95° C. and maintained for 2 hours. Stirring was stopped to allow the mixture to settle before filtering and washing the formed product 3 times. The wet cake formed was mixed with 32 g of cetyltrimethylammonium bromide and 200 ml of 0.4 ammonium hydroxide solution. The mixture was stirred at 80° ° C. for 24 hours. The formed product was filtered and washed 3 times before being dried overnight at 110° C. It was then calcined at 550° C. for 4 hours.

Comparative Example C was prepared by first combining 67 g of zeolite, 32 g of cetyltrimethylammonium bromide, and 300 ml of deionized water and heating the mixture to 90° C. Separately, 16.5 g of ammonium hexafluorosilicate was added to 200 ml of deionized water and mixed until completely dissolved. The ammonium hexafluorosilicate solution was added drop wisely to the zeolite, cetyltrimethylammonium bromide and water mixture over a period of 2 hours. The temperature of the mixture was then raised to from 90° C. to 95° C. and maintained for 2 hours. Stirring was stopped to allow the mixture to settle before filtering and washing the formed product. The wet cake was dried at 110° C. overnight before being calcined at 550° C. for 4 hours.

Sample 1 was prepared by first combining 67 g of zeolite, 32 g of cetyltrimethylammonium bromide, and 300 ml of deionized water and heating the mixture to 90° C. Separately, 16.5 g of ammonium hexafluorosilicate was added to 200 ml of deionized water and mixed until completely dissolved. 2.752 ml of concentrated ammonium hydroxide solution was then added to the ammonium hexafluorosilicate solution. The ammonium hexafluorosilicate and ammonium hydroxide solution was added drop wisely to the zeolite, cetyltrimethylammonium bromide and water mixture over a period of 2 hours. The temperature of the mixture was then raised to from 90° ° C. to 95° C. and maintained for 2 hours. Stirring was stopped to allow the mixture to settle before filtering and washing the formed product. The wet cake was dried at 110° C. overnight before being calcined at 550° C. for 4 hours.

Example 2—Characterization of Treated Zeolite Y

The mesoporous zeolites formed in Example 1, were characterized using BET, XRD, TEM, NMR, etc, the results of which are show in Table 1. The characteristics of the treated zeolites are shown in Table 1

TABLE 1

| | Comparative Example A | Comparative Example B | Comparative Example C | Sample 1 |
|---|---|---|---|---|
| Crystallinity, % | 87 | 79 | 83 | 82 |
| $SiO_2/Al_2O_3$, mol/mol | 9.75 | 10.7 | 10.5 | 9.4 |
| $Na_2O$, wt. % | 0.119 | 0.022 | 0.014 | 0.024 |
| Total surface area, $m^2/g$ | 586 | 611 | 681 | 682 |
| Total pore volume, ml/g | 0.38 | 0.49 | 0.42 | 0.55 |
| Pore size, nm | 2.6 | 3.2 | 2.5 | 3.2 |

As shown in Table 1, Sample 1 has a higher total pore volume than any of the Comparative Examples. In addition Sample 1 has a greater total surface area than any of the Comparative Examples. Further Sample 1, has an average pore size greater than or equal to the average pore size of any of the Comparative Examples. Accordingly, the method used to create Sample 1 successfully created a mesoporous zeolite with improved or similar properties to the mesoporous zeolites formed in the Comparative Examples.

According to a first aspect of the present disclosure a method of making a mesoporous zeolite may comprise combining an initial zeolite with cetyltrimethylammonium bromide to form an initial zeolite mixture, adding ammonium hexafluorosilicate and ammonium hydroxide to the initial zeolite mixture to form a treated zeolite mixture, and heating the treated zeolite mixture to form the mesoporous zeolite.

A second aspect of the present disclosure may include the first aspect where the initial zeolite mixture is not exposed to steam prior to forming the treated zeolite mixture.

A third aspect of the present disclosure may include any of the previous aspects individually or in any combination, where the method does not comprise one or more of drying, filtering, or calcining the initial zeolite mixture prior to forming the treated zeolite mixture.

A fourth aspect of the present disclosure may include any of the previous aspects individually or in any combination, where the initial zeolite comprises a Y zeolite.

A fifth aspect of the present disclosure may include any of the previous aspects individually or in any combination, where the ammonium hexafluorosilicate and ammonium hydroxide added to the initial zeolite are in an aqueous solution.

A sixth aspect of the present disclosure may include any of the previous aspects individually or in any combination, where the concentration of the ammonium hexafluorosilicate in the aqueous solution is from 0.1 M to 2.0 M.

A seventh aspect of the present disclosure may include any of the previous aspects individually or in any combination, where the concentration of the ammonium hydroxide in the aqueous solution is from 0.01 M to 1.0 M.

A eighth aspect of the present disclosure may include any of the previous aspects individually or in any combination, where the method further comprises combining the ammonium hexafluorosilicate and the ammonium hydroxide before adding them to the initial zeolite mixture.

A ninth aspect of the present disclosure may include any of the previous aspects individually or in any combination, where the ammonium hexafluorosilicate is added to the initial zeolite mixture before the ammonium hydroxide is added, or the ammonium hydroxide is added to the initial zeolite mixture before the ammonium hexafluorosilicate is added.

A tenth aspect of the present disclosure may include any of the previous aspects individually or in any combination, where nothing is added to the initial zeolite mixture prior to adding the ammonium hexafluorosilicate and the ammonium hydroxide.

An eleventh aspect of the present disclosure may include any of the previous aspects individually or in any combination, where the mesoporous zeolite has a total pore volume of at least 0.5 ml/g.

A twelfth aspect of the present disclosure may include any of the previous aspects individually or in any combination, where the mesoporous zeolite has a total surface area of at least 650 m$^2$/g.

A thirteenth aspect of the present disclosure may include any of the previous aspects individually or in any combination, where the mesoporous zeolite has a molar ratio of $SiO_2$ to $Al_2O_3$ of from 8.5 to 15

A fourteenth aspect of the present disclosure may include any of the previous aspects individually or in any combination, where the mesoporous zeolite comprises less than 0.05 wt. % of $Na_2O$.

A fifteenth aspect of the present disclosure may include any of the previous aspects individually or in any combination, where the heating of the treated zeolite mixture is at a temperature of from 35° C. to 99° C. for from 1 hour to 24 hours.

A sixteenth aspect of the present disclosure may include any of the previous aspects individually or in any combination, where the ammonium hexafluorosilicate and the ammonium hydroxide are added to the initial zeolite mixture gradually over a period of time from 1 minute to 180 minutes.

A seventeenth aspect of the present disclosure may include any of the previous aspects individually or in any combination, where the method further comprises ion-exchanging the initial zeolite prior to the combining of the initial zeolite with cetyltrimethylammonium bromide.

An eighteenth aspect of the present disclosure may include any of the previous aspects individually or in any combination, where the method further comprises heating the initial zeolite mixture to a temperature of from 30° C. to 99° C. prior to adding the ammonium hexafluorosilicate and ammonium hydroxide to the initial zeolite mixture.

A nineteenth aspect of the present disclosure may include any of the previous aspects individually or in any combination, where the concentration of cetyltrimethylammonium bromide in the initial zeolite mixture is from 0.01 M to 1.0 M.

A twentieth aspect of the present disclosure may include any of the previous aspects individually or in any combination, where the combining of the initial zeolite with the cetyltrimethylammonium bromide and the adding of the ammonium hexafluorosilicate and the ammonium hydroxide to the initial zeolite mixture occurs in a single vessel.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

What is claimed is:

1. A method of making a mesoporous zeolite, the method comprising:
    combining an initial zeolite with cetyltrimethylammonium bromide to form an initial zeolite mixture;
    adding ammonium hexafluorosilicate and ammonium hydroxide to the initial zeolite mixture to form a treated zeolite mixture; and
    heating the treated zeolite mixture to form the mesoporous zeolite.

2. The method of claim 1, wherein the initial zeolite mixture is not exposed to steam prior to forming the treated zeolite mixture.

3. The method of claim 1, wherein the method does not comprise one or more of drying, filtering, or calcining the initial zeolite mixture prior to forming the treated zeolite mixture.

4. The method of claim 1, wherein the initial zeolite comprises a Y zeolite.

5. The method of claim 1, wherein the ammonium hexafluorosilicate and ammonium hydroxide added to the initial zeolite are in an aqueous solution.

6. The method of claim 5, wherein the concentration of the ammonium hexafluorosilicate in the aqueous solution is from 0.1 M to 2.0 M.

7. The method of claim 5, wherein the concentration of the ammonium hydroxide in the aqueous solution is from 0.01 M to 1.0 M.

8. The method of claim 1, wherein the method further comprises combining the ammonium hexafluorosilicate and the ammonium hydroxide before adding them to the initial zeolite mixture.

9. The method of claim 1, wherein the ammonium hexafluorosilicate is added to the initial zeolite mixture before the ammonium hydroxide is added; or
the ammonium hydroxide is added to the initial zeolite mixture before the ammonium hexafluorosilicate is added.

10. The method of claim 1, wherein nothing is added to the initial zeolite mixture prior to adding the ammonium hexafluorosilicate and the ammonium hydroxide.

11. The method of claim 1, wherein the mesoporous zeolite has a total pore volume of at least 0.5 ml/g.

12. The method of claim 1, wherein the mesoporous zeolite has a total surface area of at least 650 m$^2$/g.

13. The method of claim 1, wherein the mesoporous zeolite has a molar ratio of $SiO_2$ to $Al_2O_3$ of from 8.5 to 15.

14. The method of claim 1, wherein the mesoporous zeolite comprises less than 0.05 wt. % of $Na_2O$.

15. The method of claim 1, wherein the heating of the treated zeolite mixture is at a temperature of from 35° C. to 99° C. for from 1 hour to 24 hours.

16. The method of claim 1, wherein the ammonium hexafluorosilicate and the ammonium hydroxide are added to the initial zeolite mixture gradually over a period of time from 1 minute to 180 minutes.

17. The method of claim 1, further comprising ion-exchanging the initial zeolite prior to the combining of the initial zeolite with cetyltrimethylammonium bromide.

18. The method of claim 1, further comprising heating the initial zeolite mixture to a temperature of from 30° C. to 99° C. prior to adding the ammonium hexafluorosilicate and ammonium hydroxide to the initial zeolite mixture.

19. The method of claim 1, wherein the concentration of cetyltrimethylammonium bromide in the initial zeolite mixture is from 0.01 M to 1.0 M.

20. The method of claim 1, wherein the combining of the initial zeolite with the cetyltrimethylammonium bromide and the adding of the ammonium hexafluorosilicate and the ammonium hydroxide to the initial zeolite mixture occurs in a single vessel.

* * * * *